United States Patent
Goto (10) Patent No.: US 9,048,677 B2
(45) Date of Patent: Jun. 2, 2015

(54) SEMICONDUCTOR DEVICE FOR PROTECTING SECONDARY BATTERY, BATTERY PACK, AND ELECTRONIC DEVICE USING SAME

(71) Applicant: Tomoyuki Goto, Kawasaki (JP)

(72) Inventor: Tomoyuki Goto, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 219 days.

(21) Appl. No.: 13/729,331

(22) Filed: Dec. 28, 2012

(65) Prior Publication Data

US 2013/0154564 A1 Jun. 20, 2013

Related U.S. Application Data

(62) Division of application No. 12/358,383, filed on Jan. 23, 2009, now Pat. No. 8,367,234.

(30) Foreign Application Priority Data

Feb. 1, 2008 (JP) .................................. 2008-022316

(51) Int. Cl.
H01M 10/48 (2006.01)
H02J 7/00 (2006.01)

(52) U.S. Cl.
CPC .............. H02J 7/007 (2013.01); H01M 10/48 (2013.01); H02J 7/0031 (2013.01); *H02J 2007/0037* (2013.01); *H02J 2007/0039* (2013.01); *H02J 2007/004* (2013.01)

(58) Field of Classification Search
CPC ....... H01M 10/48; H02J 7/0031; H02J 7/007; H02J 2007/0039; H02J 2007/004; H02J 2007/0037
See application file for complete search history.

(56) References Cited

U.S. PATENT DOCUMENTS

| 5,705,913 A | 1/1998 | Takeuchi et al. |
| 6,380,763 B1 * | 4/2002 | Ando .............................. 326/81 |
| 2006/0125540 A1 * | 6/2006 | Todaka .......................... 327/215 |
| 2007/0103143 A9 * | 5/2007 | Ooshita et al. ................ 324/134 |

FOREIGN PATENT DOCUMENTS

| CN | 1270432 A | 10/2000 |
| JP | 7-75247 | 3/1995 |
| JP | 11-89098 | 3/1999 |
| JP | 3710920 | 8/2005 |
| JP | 2008-5547 | 1/2008 |
| JP | 4062618 | 1/2008 |

* cited by examiner

*Primary Examiner* — Muhammad Siddiquee
(74) *Attorney, Agent, or Firm* — Cooper & Dunham LLP (57) ABSTRACT

A battery pack includes a secondary battery, a discharge-control transistor, a charge-control transistor connected in series with the discharge-control transistor between a negative power source terminal of the secondary battery and a terminal of a load or a negative power source terminal of a charger, and a battery protection semiconductor device including a detection circuit that detects at least one of excessively charged, excessive discharging, overcurrent, short-circuit, and overheating states of the secondary battery, a control circuit that turns on and off the discharge-control transistor and the charge-control transistor, and a charge prevention circuit that prevents the secondary battery from being charged by turning off the charge-control transistor when a voltage of the secondary battery is not greater than a predetermined low-voltage criterial voltage variable by trimming a portion of the charge prevention circuit. The charge prevention circuit includes first and second inverter circuits.

15 Claims, 6 Drawing Sheets

SEMICONDUCTOR DEVICE FOR PROTECTING SECONDARY BATTERY, BATTERY PACK, AND ELECTRONIC DEVICE USING SAME

CROSS-REFERENCE TO RELATED APPLICATIONS

This is a divisional of U.S. patent application Ser. No. 12/358,383 filed on Jan. 23, 2009, which claims the priority of Japanese Patent Application No. 2008-022316 filed with the Japanese Patent Office on Feb. 1, 2008.

BACKGROUND OF THE INVENTION

1. Field of the Invention

The present invention generally relates to a semiconductor device for protecting a secondary battery and a battery pack for a whole category of electronic equipment installed in computerized personal organizers, handsets, voice recognition devices, voice memory devices, computers, etc.

2. Discussion of the Background

Battery packs including at least one secondary battery are widely used in portable electronic equipment such as mobile phones and digital cameras for its ease of handling. As secondary batteries, large-capacity batteries, such as lithium ion batteries, lithium polymer batteries, and nickel metal hydride batteries, are generally used.

It is to be noted that, in the present specification, "current" represents an electrical current unless otherwise specified.

Because the amount of energy stored in such large-capacity batteries is extremely large, it can be degraded when charged excessively to an extremely high voltage, discharging electricity excessively, to have an extremely low voltage, and when receiving or outputting an overcurrent, which can lead to heat generation or even overheating to the point of ignition. (A value of the voltage remaining in the secondary battery below which the battery can be degraded is hereinafter referred to as an excessive-discharge voltage.)

Therefore, battery packs are generally provided with a protection circuit for preventing the secondary battery from being charged excessively, discharging electricity excessively, receiving or outputting overcurrent, outputting a short-circuit current, overheating, etc. In such cases, the protection circuit disconnects the secondary battery from a charger or a load, preventing the secondary battery from overheating and igniting as well as deteriorating.

Further, when the voltage of the secondary battery is below the excessive-discharge voltage, that is, extremely low (hereinafter "low voltage state"), connecting the battery pack to the charger is dangerous. More specifically, when the secondary battery is in the low voltage state, the secondary battery can be in an abnormal state, such as a short circuit. If the secondary battery in such an abnormal state is charged, the secondary battery will generate heat or be damaged, which might cause ignition thereof.

In view of the foregoing, a known battery pack is provided with a charge prevention circuit that prevents charging the secondary battery in the low voltage state.

Such a charge prevention circuit determines whether or not the secondary battery Bat is extremely low (hereinafter also "low-voltage detection level" or "low-voltage criterial voltage") based on a particular reference voltage. Moreover, the low-voltage criterial voltage is preferably variable among multiple set values.

In a known charge prevention circuit, the low-voltage criterial voltage can be lowered by a voltage identical to a threshold voltage of an NMOS transistor included in the charge prevention circuit. However, the low-voltage criterial voltage cannot be raised.

Therefore, there is a need to be able to set the low-voltage criterial voltage for the secondary battery more flexibly.

SUMMARY OF THE INVENTION

In view of the foregoing, one illustrative embodiment of the present invention provides a battery protection semiconductor device for protecting a secondary battery. The battery protection semiconductor device includes a detection circuit, a control circuit, and a charge prevention circuit. The detection circuit detects at least one of an excessively charged state, an excessive discharging state, an overcurrent state, a short-circuit state, and an overheating state of the secondary battery. The control circuit turns on and off the discharge-control transistor and the charge-control transistor. The charge prevention circuit prevents the secondary battery from being charged by turning off the charge-control transistor when a voltage of the secondary battery is not greater than a predetermined low-voltage criterial voltage that is variable by trimming a portion of the charge prevention circuit.

In another illustrative embodiment of the present invention, a battery pack includes a secondary battery, a discharge-control transistor, a charge-control transistor connected in Series with the discharge-control transistor between a negative power source terminal of the secondary battery and either a terminal of a load or a negative power source terminal of a charger, and the battery protection semiconductor device described above.

Yet in another illustrative embodiment of the present invention, the battery pack described above is incorporated in an electronic device.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Figure 1:
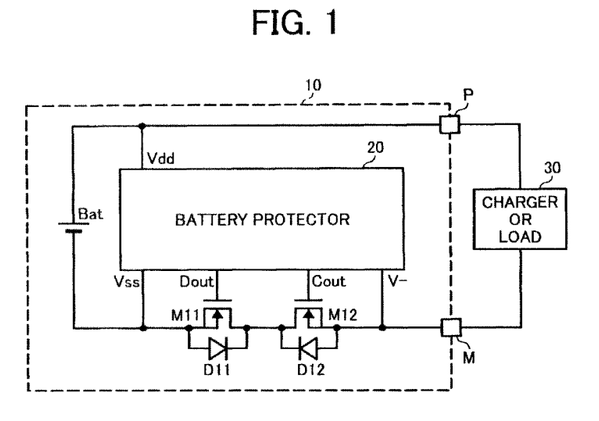
FIG. 1 illustrates circuitry in which a battery pack provided with a battery protector according to an illustrative embodiment of the present invention is connected to a charger or load.
Figure 2:
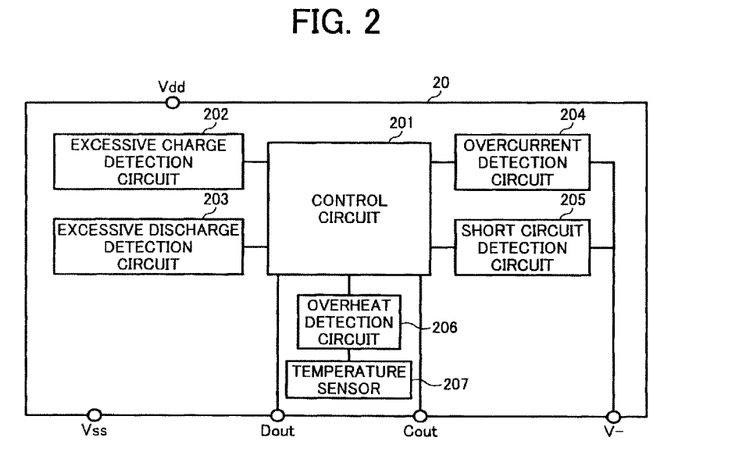
FIG. 2 illustrates an example of circuitry of the battery protector shown in FIG. 1.

Referring now to the drawings, wherein like reference numerals designate identical or corresponding parts throughout the several views thereof, and particularly to FIGS. 1 and 2, a battery protector for protecting a secondary battery according to an illustrative embodiment of the present invention is described.

FIG. 1 illustrates an example of circuitry of a battery pack 10 provided with a battery protector 20 for protecting a secondary battery Bat, and the battery pack 10 is connected to a charger or load 30. The battery pack 10 discharges electricity to a piece of electrical equipment (load) when connected thereto and is charged with electricity when connected to a charger.

Referring to FIG. 1, the battery pack 10 further includes a discharge-control NMOS (N-channel Metal Oxide Semiconductor) transistor M11 (hereinafter also "NMOS transistor M11") for controlling discharge from the secondary battery Bat, a charge-control NMOS transistor M12 (hereinafter also "NMOS transistor M12") for controlling charging of the secondary battery Bat (hereinafter "second battery charging"), and diodes D11 and D12. The battery protector 20 is a battery protection semiconductor device that protects the secondary battery Bat from being excessively charged, discharging electricity excessively, receiving or outputting overcurrent, and outputting a short-circuit current.

As shown in FIG. 1, a positive power source terminal of the secondary battery Bat is connected to a positive power source terminal P of the battery pack 10 as well as a positive power source terminal Vdd of the battery protector 20. A negative power source terminal of the secondary battery Bat is connected to a negative power source terminal Vss of the battery protector 20 as well as a terminal (hereinafter "first terminal") of the discharge-control NMOS transistor M11. The other terminal (hereinafter "second terminal") of the discharge-control NMOS transistor M11 is connected to a terminal (hereinafter "first terminal") of the NMOS transistor M12. The other terminal (hereinafter "second terminal") of the NMOS transistor M12 is connected to a negative power source terminal M of the battery pack 10 as well as a negative power source terminal V− of the battery protector 20 to be connected to a negative power source terminal of the charger 30.

The positive power source terminal of the secondary battery Bat and a positive power source terminal of the charger 30 can be connected together to the positive power source terminal Vdd or can be connected to an identical power source voltage Vdd.

Further, gates of the discharge-control NMOS transistor M11 and the NMOS transistor M12 are respectively connected to a discharge-control terminal Dout and a charge-control terminal Cout of the battery protector 20.

It is to be noted that the diodes D11 and D12, which are connected in parallel to the NMOS transistors N11 and M12, are parasitic diodes generated when the NMOS transistors M11 and M12 are configured as a semiconductor. The positive power source terminal and the negative power source terminal of the charger or load 30 are respectively connected to the positive power source terminal P and the negative power source terminal M of the battery pack 10.

FIG. 2 illustrates a configuration of the battery protector 20.

As shown in FIG. 2, the battery protector 20 includes a control circuit 201, an excessive charge detection circuit 202, an excessive discharge detection circuit 203, an overcurrent detection circuit 204, a short-circuit detection circuit 205, an overheat detection circuit 206, and a temperature sensor 207.

The above-mentioned detection circuits 202 through 206 respectively output detection signals when detecting an abnormal state of the secondary battery Bat, such as an excessively charged state, an excessive discharging state, an overcurrent state, a short-circuit state, and an overheating state, that requires a protective operation. Then, the control circuit 201 outputs a signal to either the discharge-control terminal Dout or the charge-control terminal Cout (shown in FIG. 1) based on those detection signals so as to turn off either the NMOS transistor M11 or M12 provided between the secondary battery Bat and the charger or load 30, thereby disconnecting the secondary battery Bat from the charger or load 30 to protect the secondary battery Bat.

In the battery pack 10 described above, the discharge-control NMOS transistor M11 is off when the voltage of the secondary battery Bat is lower than a dischargeable voltage. If the charger 30 is connected to the battery pack in this state, the charge-control NMOS transistor M12 is turned on, thereby enabling the charger 30 to charge the secondary battery Bat through the parasite diode D11 and the NMOS transistor M12.

However, it is dangerous if the secondary battery Bat is charged when the secondary battery Bat is in a low voltage state as described above. Therefore, the battery pack 10 further includes a charge prevention circuit that prevents charging of the secondary battery Bat when its voltage is lower than a reference voltage.

Figure 5:
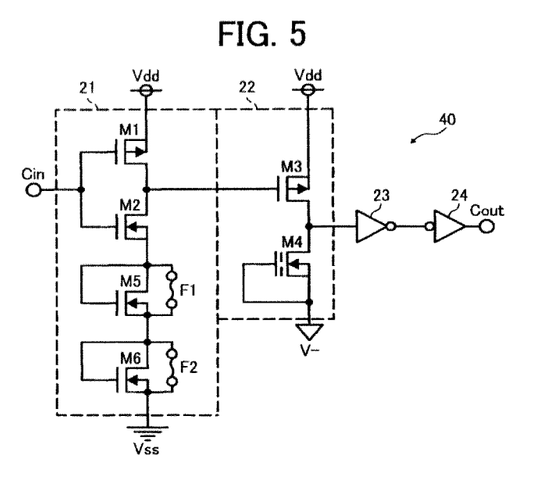
FIG. 5 illustrates an example of circuitry of a charge prevention circuit according to an illustrative embodiment of the present invention.

Before describing the charge prevention circuit according to the present embodiment, which is shown in FIG. 5, comparative charge prevention circuits are described below.

Figure 3:
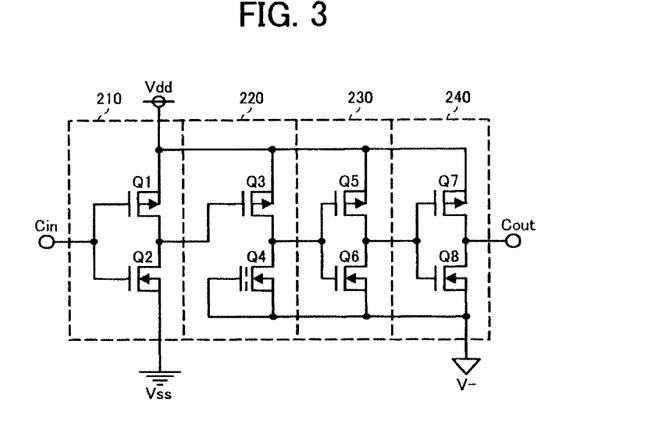
FIG. 3 illustrates a charge prevention circuit according to a comparative example.

FIG. 3 illustrates a first comparative charge prevention circuit.

Referring to FIG. 3, the first comparative charge prevention circuit includes a first inverter circuit 210, a second inverter circuit 220, a third inverter circuit 230, and a fourth inverter circuit 240.

The first inverter circuit 210 includes a PMOS (P-channel Metal Oxide Semiconductor) transistor Q1 and an NMOS transistor Q2. The second inverter circuit 220 includes a PMOS transistor Q3 and a depression-type NMOS transistor Q4. The third inverter circuit 230 includes a PMOS transistor Q5 and an NMOS transistor Q6. The fourth inverter circuit 240 includes a PMOS transistor Q7 and an NMOS transistor Q8.

The first inverter circuit 210 is configured as a CMOS (Complementary Metal Oxide Semiconductor), and a power source thereof is connected to both the positive power source terminal Vdd and the negative power source terminal Vss. While a signal input to an input terminal Cin is high, that is, during a charging mode, the first inverter circuit 210 controls charging of the secondary battery Bat. An output terminal of the first inverter circuit 210 is connected to an input terminal of the second inverter circuit 220, that is, a gate of the PMOS transistor Q3.

In the second inverter circuit 220, a source of the PMOS transistor Q3 is connected to the positive voltage Vdd, and a drain thereof is connected to a drain of the depression-type NMOS transistor Q4. A gate and a source of the depression-type NMOS transistor Q4 are connected, and a junction node therebetween is connected to the negative power source terminal V− connected to the negative power source terminal of the charger 30. Because the gate of the depression-type NMOS transistor Q4 is connected the source thereof, a bias voltage is 0 volt (V), and thus the depression-type NMOS transistor Q4 serves as a constant-current load of the PMOS transistor Q3.

A junction node between the drains of the PMOS transistor Q3 and the depression-type NMOS transistor Q4 serves as an output terminal of the second inverter circuit 220 and is connected to an input terminal of the third inverter circuit 230. The third inverter circuit 230 is configured as a CMOS and, a power source thereof is connected to both the positive power source terminal Vdd and the negative power source terminal V−. An output terminal of the third inverter terminal 230 is connected to an input terminal of the fourth inverter circuit 240.

The fourth inverter circuit 240 is configured as a CMOS as well, and a power source thereof is connected to both the positive power source terminal Vdd and the negative power source terminal V−. An output terminal of the fourth inverter circuit 240 is connected to a charge-control terminal Cout.

Referring to FIGS. 1 and 3, control of charging of the secondary battery using the first comparative charge prevention circuit is described below.

In the first comparative charge prevention circuit described above, while the secondary battery has a voltage higher than both a threshold voltage of the NMOS transistor Q2 and that of the PMOS transistor Q3, the NMOS transistor Q2 is turned on when the input terminal Cin of the first inverter circuit 210 rises to high, and thus the first inverter circuit 210 outputs a low-level signal.

Subsequently, the PMOS transistor Q3 of the second inverter circuit 220 is turned on, and then the second inverter circuit 220 outputs a high-level signal. This signal is inverted by the third inverter circuit 230 and the fourth inverter circuit 240, that is, inverted twice, and thus the charge-control terminal Cout outputs a high-level signal.

Then, the high-level signal output from the charge-control terminal Cout is input to the gate of the charge-control NMOS transistor M12 shown in FIG. 1, turning on the NMOS transistor M12, and thus the charger 30 charges the secondary battery Bat.

By contrast, when the voltage of the, secondary battery Bat is lower than the threshold voltage of the NMOS transistor Q2, the NMOS transistor Q2 cannot be turned on even when the input terminal Cin of the first inverter circuit 210 is high. Thus, the first inverter circuit 210 outputs high impedance, preventing the PMOS transistor Q3 of the second inverter circuit 230 from turning on. In this state, a signal output from the second inverter circuit 220 is low, and accordingly the charge-control terminal Cout is low, which turns off the charge-control NMOS transistor M12, thereby preventing the secondary battery Bat from being charged.

Figure 4:
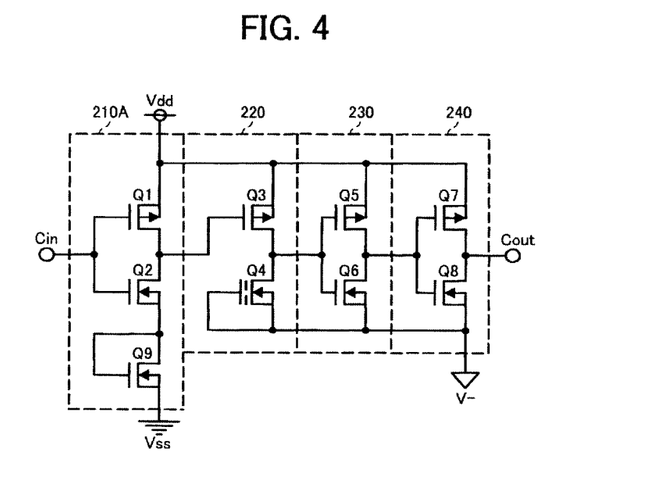
FIG. 4 illustrates a charge prevention circuit according to another comparative example.

FIG. 4 illustrates a second comparative charge prevention circuit. It is to be noted that, except for the description below, the second comparative charge prevention circuit shown in FIG. 4 has a configuration similar to that of the first comparative charge prevention circuit shown in FIG. 3.

As shown in FIG. 4, instead of the first inverter circuit 210 shown in FIG. 3, the second comparative charge prevention circuit includes a first inverter circuit 210A in which a NMOS transistor Q9 is connected between a source of a NMOS transistor Q2 and the negative power source terminal Vss. The NMOS transistor Q9 is so-called diode-connected, that is, a drain of the NMOS transistor Q9 is connected to a gate thereof.

In the second comparative charge prevention circuit, the NMOS transistors Q2 and Q9 can be turned on only when the voltage at an input terminal Cin of the first inverter circuit 210A is greater than the sum of threshold voltages of the NMOS transistors Q2 and the Q9.

Further, even when the NMOS transistors Q2 and the Q9 are on, and accordingly the first inverter circuit 210A outputs a low-level signal (voltage), a PMOS transistor Q3 cannot be turned on unless the voltage of the secondary battery at is greater than the sum of the voltages of the NMOS transistor Q9 and the PMOS transistor Q3. This is because the voltage output from the first inverter circuit 210A is higher than the voltage of the negative power source terminal Vss by a voltage identical to the threshold voltage of the NMOS transistor Q9.

In other words, when the voltage of the secondary battery is equal to or lower than the sum of the threshold voltages of the NMOS transistor Q2 and Q9, or the sum of the NMOS transistor Q9 and the PMOS transistor Q3, the charge-control terminal Cout outputs a low-level signal, thereby turning off the charge-control NMOS transistor M12. Thus, charge electricity from the charger 30 to the secondary battery Bat is shut off.

By thus including the NMOS transistor Q9 in the first inverter circuit 210A, the low voltage state of the secondary battery Bat can be better detected.

However, in the first comparative charge prevention circuit shown in FIG. 3, a low-voltage detection level" or "low-voltage criterial voltage", based on the basis of which whether or not the voltage of the secondary battery Bat is extremely low is detected can only be changed by a voltage identical to the threshold voltage of the NMOS transistor. Further, the reference voltage cannot be lowered, although it can be raised.

Additionally, the low-voltage detection level should be changed for each semiconductor device, which increases types of the semiconductor devices used in the battery pack.

In view of the foregoing, the battery protector 20 shown in FIG. 2 according to the present embodiment further includes a charge prevention circuit 40, shown in FIG. 5, that inhibits charging of the secondary battery Bat by turning off the charge-control NMOS transistor M12 when the voltage of the secondary battery Bat is not greater than a predetermined or given low-voltage criterial voltage that is variable by trimming a portion thereof.

Referring to FIG. 5, the charge prevention circuit 40 includes a first inverter circuit 21, a second inverter circuit 22, inverter circuits 23 and 24, the positive power source terminal Vdd connected to the positive power source terminals of the secondary battery Bat and the charger 30, the negative power source terminal Vss connected to the negative power source terminal of the secondary battery Bat, the negative power source terminal V− connected to the negative power source terminal of the charger 30, an input terminal Cin, and the charge-control terminal Cout connected to the gate of the charge-control NMOS transistor M12.

The first inverter circuit 21 includes a PMOS transistor M1, NMOS transistors M2, M5, and M6, and trimming fuses F1 and F2. The second inverter circuit 22 includes a PMOS transistor M3 and a depression-type NMOS transistor M4. The PMOS transistor M1 and the NMOS transistor M2 can serve as a first PMOS transistor and a first NMOS transistor, respectively.

In the first inverter circuit 21, a source and a drain of the PMOS transistor M1 are respectively connected to the positive power source terminal Vdd and a drain of the NMOS transistor M2. A gate of the PMOS transistor M1 is connected to both a gate of the NMOS transistor M2 and the input terminal Cin.

A source of the NMOS transistor M2 is connected to a drain of the NMOS transistor M5 whose gate is connected to its drain (diode-connected). A source of the NMOS transistor M5 is connected to a drain of the NMOS transistor M6 whose gate is connected to its drain as well. A source of the NMOS transistor M6 is connected to the negative power source terminal Vss.

Further, a junction node between the drains of the PMOS transistor M1 and the NMOS transistor M2 serves as an output terminal of the first inverter circuit 21. The trimming fuse F1 is connected between the source and the drain of the NMOS transistor M5, and the trimming fuse F2 is connected between the source and the drain of the NMOS transistor M6.

In the second inverter circuit 22, a source and a drain of the PMOS transistor M3 are connected to the positive power source terminal Vdd and a drain of the depression-type NMOS transistor M4, respectively. A gate of the NMOS transistor M3 serves as an input terminal of the second inverter circuit 22, which is connected to the output terminal of the first inverter circuit 21.

A gate and a source of the depression-type NMOS transistor M4 are connected together to the negative power source terminal V−. A junction node between the drains of the PMOS transistor M3 and the depression-type NMOS transistor M4 serves as an output terminal of the second inverter circuit 22, which is connected to an input terminal of the inverter circuit 23.

An output terminal of the inverter circuit 23 is connected to an input terminal of the inverter circuit 24, and an output terminal of the inverter circuit 24 is connected to the charge-control terminal Cout.

It is to be noted that, although not shown in FIG. 5, power sources of the inverter circuits 23 and 24 are connected to both the positive power source terminal Vdd and the negative power source terminal V−.

When the trimming fuses F1 and F2 are connected thereto, the charge prevention circuit 40 shown in FIG. 5 operates in a manner similar to that of the first comparative charge prevention circuit shown in FIG. 3. That is, when the secondary battery Bat has a voltage not greater than a threshold voltage of either the NMOS transistor M2 or the FMOS transistor M3, the charge-control terminal Cout of the charge prevention circuit 40 turns to a low level, thereby turning off the charge-control NMOS transistor M12 and thus inhibiting charging of the secondary battery Bat.

By contrast, when either the trimming fuse F1 or F2 is trimmed, that is, disconnected from the charge prevention circuit 40 using a laser light or the like, the charge prevention circuit 40 operates in a manner similar to that of the second comparative charge prevention circuit shown in FIG. 4. That is, when the voltage of the secondary battery Bat is not greater than the sum of the threshold voltage of the NMOS transistors M2 and the threshold voltage of either the NMOS transistor M5 or M6, or the sum of the threshold voltages of the PMOS transistor M3 and either the NMOS transistor M5 or M6, the charge-control terminal Cout turns to the low level, thereby turning off the charge-control NMOS transistor M12 and thus inhibiting charging of the secondary battery Bat.

Further, in a state in which both the trimming fuses F1 and F2 are trimmed with a laser light or the like, when the voltage of the secondary battery Bat is not greater than the sum of the thresholds of the NMOS transistors M2, M5, and M6, or the sum of the thresholds of the PMOS transistor M3 and the NMOS transistors M5 and M6, the charge-control terminal Cout turns to the low level, thereby turning off the charge-control NMOS transistor M12 and thus inhibiting charging of the secondary battery Bat.

As described above, by trimming either or both the trimming fuses F1 and F2, the low-voltage detection level (criterial voltage) of the charge prevention circuit 40 can be set three different levels and raised in the order: (1) the threshold voltage of either the NMOS transistor M2 or the PMOS transistor M3; (2) the sum of the threshold voltage of the NMOS transistors M2 and the threshold voltage of either the NMOS transistor M5 or M6, or the sum of the threshold voltages of the PMOS transistor M3 and either the NMOS transistor M5 or M6; and (3) the sum of the thresholds of the NMOS transistors M2, M5, and M6, or the sum of the thresholds of the PMOS transistor M3 and the NMOS transistors M5 and M6.

It is to be noted that, although the above description concerns the configuration including two NMOS transistors each of which includes the trimming fuse connected between the diode-connected source and gate thereof, the number of those NMOS transistors is not limited thereto but can be changed depending on the low-voltage detection level.

Additionally, the low-voltage criterial voltage (detection level) can be raised by changing the threshold voltage of each of the diode-connected NMOS transistors.

Charge prevention circuits according to other embodiments are described below.

Figure 6:
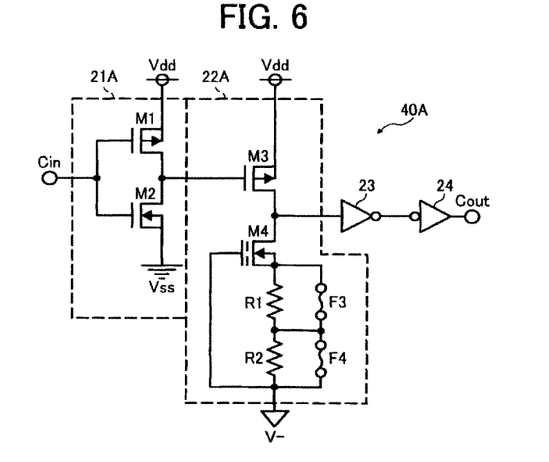
FIG. 6 illustrates an example of circuitry of a charge prevention circuit according to another illustrative embodiment.

FIG. 6 illustrates a configuration of a charge prevention circuit 40A, in which the charge prevention circuit 40A includes a first inverter circuit 21A, a second inverter circuit 22A, and inverter circuits 23 and 24. The first inverter circuit 21A is configured as a CMOS and includes a PMOS transistor M1 and an NMOS transistor M2. The second inverter circuit 22A includes a PMOS transistor M3, a depression-type NMOS transistor M4, resistors R1 and R2, and trimming fuses F3 and F4. The PMOS transistor M3 and the depression-type NMOS transistor M4 can serve as a second PMOS transistor and a first depression-type NMOS transistor, respectively.

Connection of the PMOS transistor M3 is identical or similar to that of the charge prevention circuit 40 shown in FIG. 5. The resistors R1 and R2 are connected serially between a source of the depression-type NMOS transistor M4 and the negative power source terminal V− connected to the negative power source terminal of the charger 30 shown in FIG. 1. The trimming fuses F3 and F4 are connected in parallel to the resistors R1 and R2, respectively.

While the trimming fuses F3 and F4 are connected thereto, a configuration of the charge prevention circuit 40A is similar to that of the first comparative charge prevention circuit shown in FIG. 3. That is, when the secondary battery Bat has a voltage not greater than a threshold voltage of either the NMOS transistor M2 or the PMOS transistor M3, the charge-control terminal Cout turns low, thereby turning off the charge-control NMOS transistor M12. Thus, charging of the secondary battery Bat is inhibited.

By contrast, when the trimming fuse F3 is trimmed, instead, the resistor R1 is connected between the depression-type NMOS transistor M4 and the negative power source terminal V−, and a drain current of the depression-type NMOS transistor 44 flows into the resistor R1, which causes voltage across the resistor R1 to decrease. Therefore, a gate voltage of the depression-type NMOS transistor M4 is decreased to below a power source thereof. In other words, because the gate of the depression-type NMOS transistor M4 is biased to a negative voltage, the drain current of the depression-type NMOS transistor M4 decreases from that in a state in which the bias voltage is 0 V.

Because the drain current of the depression-type NMOS transistor M4 is identical or similar to that of the PMOS transistor M3, the drain current of the PMOS transistor M3 decreases as well. Then, the decrease in the drain current of the PMOS transistor M3 lowers the threshold voltage of the PMOS transistor M3. Accordingly, while the first inverter circuit 21A outputs the low-level signal, the PMOS transistor M3 remains on even when the voltage of the secondary battery Bat has decreased to a voltage lower than the voltage with which the PMOS transistor M3 is turned off when the trimming fuse F3 is not trimmed.

Thus, the low-voltage detection level can be lowered because the PMOS transistor M3 thereof can be turned off at a voltage lower than that of the first comparative charge prevention circuit shown in FIG. 3.

It is to be noted that an important point is that the threshold voltage of the NMOS transistor M2 be lower than that of the PMOS transistor M3 for effective performance of the charge prevention circuit 40A. In addition, the threshold voltage of the PMOS transistor M3 can be further lowered by trimming both the trimming fuses F3 and F4.

In other words, because the input threshold voltage of the PMOS transistor is changed, the low-voltage criterial voltage can be changed step-by-step in a range smaller than the input threshold voltage of the PMOS transistor.

Moreover, by setting the resistors R1 and R2 to have different resistance values, the threshold voltage can be varied among three levels. Further, by increasing the number of sets of the resistor and the trimming fuse connected in parallel that are connected serially between the source of the depression-type NMOS transistor M4 and the negative power source terminal of the charger 30, a range of the low-voltage criterial voltage can be extended, and the low-voltage criterial voltage can be set at shorter intervals.

Figure 7:
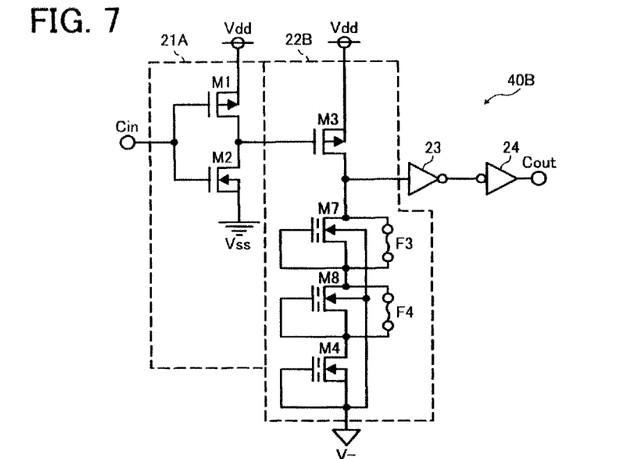
FIG. 7 illustrates an example of circuitry of a charge prevention circuit according to another illustrative embodiment.

FIG. 7 illustrates an example of circuitry of a charge prevention circuit 40B according to another embodiment.

Referring to FIG. 7, the charge prevention circuit 40B includes a second inverter circuit 22B instead of the second inverter circuit 22A shown in FIG. 6. Different from the second inverter circuit 22A shown in FIG. 6, the second inverter circuit 22B does not include the resistors R1 and R2 but include depression-type NMOS transistors M7 and M8 that can serve as second depression-type NMOS transistors. The depression-type NMOS transistors M7 and M8 are connected serially between drains of a PMOS transistor M3 and a depression-type NMOS transistor M4 that can serve as a first depression-type NMOS transistor. Gates of the depression-type NMOS transistors M7 and M8 are respectively connected to their sources, and their back gates are connected to the negative power source terminal V− connected to the negative power source terminal of the charger 30.

Except for the description above, the charge prevention circuit 40B has a configuration identical or similar to that of the charge prevention circuit 40A shown in FIG. 6.

While fuses F3 and F4 are connected thereto, the charger prevention circuit 40B described above has a configuration similar to that of the first comparative charge prevention circuit shown in FIG. 3 and thus operates similarly thereto.

By contrast, when the trimming fuse F3 is trimmed, instead, the depression-type NMOS transistor M7 is connected between the drains of the PMOS transistor M3 and the depression-type NMOS transistor 44. In this state, because the back gate and the source of the depression-type NMOS transistor M7 are respectively connected to the negative power source terminal V− and the drain of the depression-type NMOS transistor M4, a potential of the back gate is lower than that of the source. Accordingly, due to substrate bias effect, a threshold voltage of the depression-type NMOS transistor M7 is raised, decreasing a drain current when the bias voltage is 0 V.

As a result, a drain current of the PMOS transistor M3 is decreased, which lowers a threshold voltage of the PMOS transistor M3 similarly to the charge prevention circuit 40A shown in FIG. 6. Thus, the low-voltage detection level can be lowered.

The threshold voltage of the depression-type NMOS transistor M7 can be further raised by trimming both the trimming fuses F3 and F4, which decreases the drain current when the bias voltage is 0 V. Thereby, the threshold of the PMOS transistor M3 is further lowered, lowering the low-voltage detection level.

It is to be noted that it is important that a threshold voltage of the NMOS transistor M2 be lower than that of the PMOS transistor M3 for effective performance of the charge prevention circuit 40B similarly to the charge prevention circuit 40A shown in FIG. 6.

Figure 8:
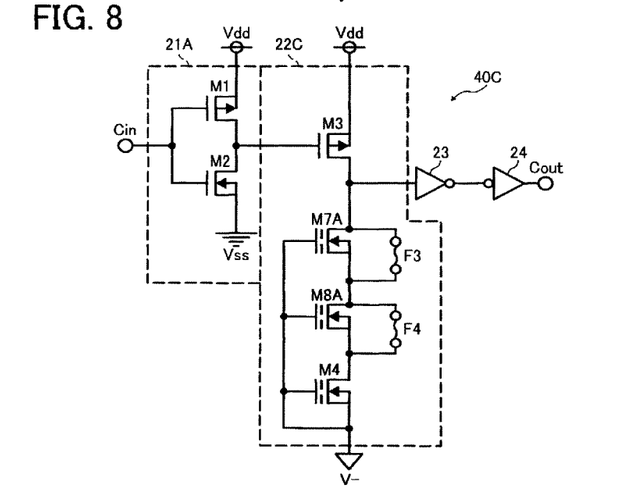
FIG. 8 illustrates an example of circuitry of a charge prevention circuit according to another illustrative embodiment.

FIG. 8 illustrates a configuration of a charge prevention circuit 40C according to another embodiment.

Instead of the second inverter circuit 22B shown in FIG. 7, the charge prevention circuit 40C includes a second inverter circuit 22C including depression-type NMOS transistors M7A and M8A, serving as second depression-type NMOS transistors, connected serially between drains of a PMOS transistor M3 (second PMOS transistor) and a depression-type NMOS transistor M4 (first depression-type NMOS transistor) as shown in FIG. 8. The charge prevention circuit 40C shown in FIG. 8 is different from the charge prevention circuit 40B shown in FIG. 7 in that back gates of the depression-type NMOS transistors M7A and M8A are respectively connected to their sources, and their gates are connected to the negative power source terminal V− connected to the negative power source terminal of the charger 30.

Except for the description above, the charge prevention circuit 40C has a configuration identical or similar to that of the charge prevention circuit 40B shown in FIG. 7.

While fuses F3 and F4 are connected thereto, the charger prevention circuit 40C described above has a configuration similar to that of the first comparative charge prevention circuit shown in FIG. 3 and operates similarly thereto.

By contrast, when the trimming fuse F3 is trimmed, instead, the depression-type NMOS transistor M7A is connected between the drains of the PMOS transistor M3 and the depression-type NMOS transistor 44. In this state, because a source potential of the depression-type NMOS transistor M7A is identical to a drain potential of the depression-type NMOS transistor M4, its gate is biased to a negative voltage. Accordingly, a drain current of the depression-type NMOS transistor M7A is decreased, and thus the drain current of the depression-type NMOS transistor M4 is decreased to a current value identical to the drain current of the depression-type NMOS transistor M7A.

As a result, a drain current of the PMOS transistor M3 is decreased, which lowers a threshold voltage of the PMOS transistor M3 similarly to the charge prevention circuit 40A shown in FIG. 6. Thus, the low-voltage criterial voltage can be lowered.

The low-voltage criterial voltage can be further lowered by trimming both the trimming fuses F3 and F4.

It is to be noted that it is important that a threshold voltage of the NMOS transistor M2 be lower than that of the PMOS transistor M3 for effective performance of the charge prevention circuit 40C similarly to the charge prevention circuits 40A and 40B shown in FIGS. 6 and 7.

Figure 9:
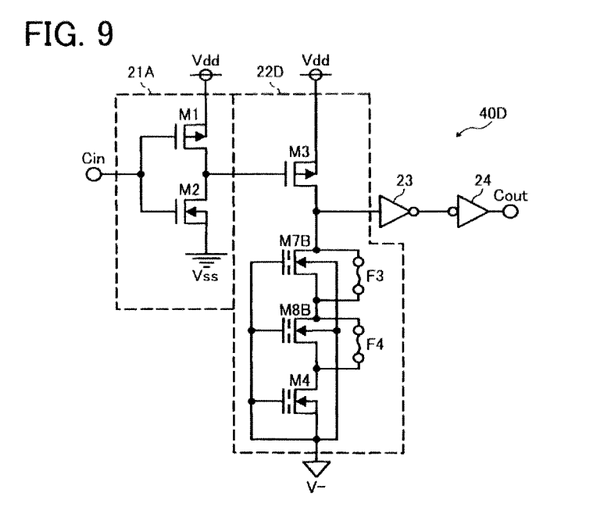
FIG. 9 illustrates an example of circuitry of a charge prevention circuit according to another illustrative embodiment.

FIG. 9 illustrates an example of circuitry of a charge prevention circuit 40D according to another embodiment.

Instead of the second inverter circuit 22C shown in FIG. 8, the charge prevention circuit 40D includes a second inverter circuit 22D including depression-type NMOS transistors M7B and M8B, serving as second depression-type NMOS transistors, connected serially between drains of e PMOS transistor M3 (second PMOS transistor) and a depression-type NMOS transistor 44 (first depression transistor) as shown in FIG. 9. The charge prevention circuit 40D shown in FIG. 9 is different from the charge prevention circuit 40C shown in FIG. 8 in that back gates of the depression-type NMOS transistors M7B and M8B are connected to the negative power source terminal V− connected to the negative power source terminal of the charger 30.

Except for the description above, the charge prevention circuit 40D has a configuration identical or similar to that of the charge prevention circuit 40C shown in FIG. 8.

Operations of the charge prevention circuit 40D are similar to those of the charge prevention circuit 40C shown in FIG. 8. However, because the back gates of the depression-type NMOS transistors M7B and M8B are connected to the negative power source terminal V−, the low-voltage detection level can be lowered more significantly due to the substrate bias effect.

It is to be noted that, although the embodiments described above with reference to FIGS. 7 through 9 concern the configurations in which two sets of the depression-type NMOS transistor and the trimming fuse connected between the source and the drain of that depression-type NMOS transistor, the number of the sets is not limited and can be changed depending on a preferable low-voltage criterial voltage. Moreover, the threshold voltages of the depression-type NMOS transistors can be set to different voltages.

Figure 10:
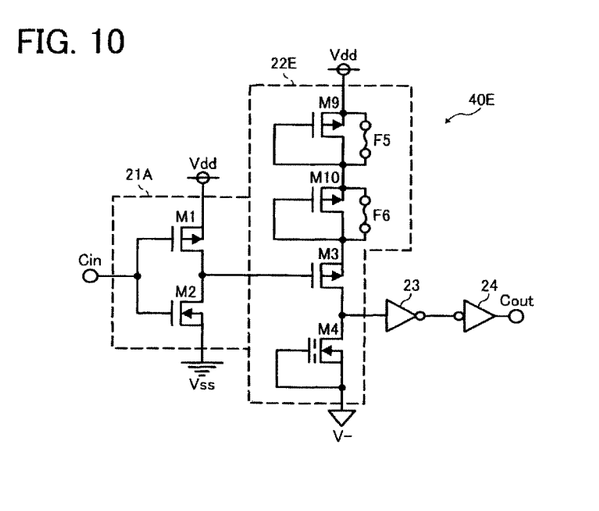
FIG. 10 illustrates an example of circuitry of a charge prevention circuit according to another illustrative embodiment.

FIG. 10 illustrates an example of circuitry of a charge prevention circuit 40E according to another embodiment.

Referring to FIG. 10, instead of the second inverter circuit 22D shown in FIG. 9, the charge prevention circuit 40E includes a second inverter circuit 22E that includes a PMOS transistor M3 (second PMOS transistor), a depression-type NMOS transistor M4, diode-connected PMOS transistors M9 and M10, and trimming fuses F5 and F6.

The diode-connected PMOS transistors M9 and M10 are connected serially between a source of the PMOS transistor M3 and the positive power source terminal Vdd. The trimming fuse F5 is connected between a source and a drain of the PMOS transistor M9, and the trimming fuse F6 is connected between a source and a drain of the PMOS transistor M10.

Except for the description above, the charge prevention circuit 40E has a configuration identical or similar to that of the charge prevention circuit 40D shown in FIG. 9.

While the trimming fuses F5 and F6 are connected thereto, the charger prevention circuit 40E described above has a configuration similar to that of the first comparative charge prevention circuit shown in FIG. 3 and operates similarly thereto.

By contrast, when either the trimming fuse F5 or F6 is disconnected from the charger prevention circuit 40E, either the diode-connected PMOS transistor M9 or M10 is connected between the source of the PMOS transistor M3 and the positive power source terminal Vdd. In this state, while a first inverter circuit 21A outputs a low-level signal, the PMOS transistor M3 is turned off when the voltage of the secondary battery Bat shown in FIG. 1 is not greater than the sum of threshold voltages of the PMOS transistor M3 and either the PMOS transistor M9 or M10.

Thereby, the second inverter circuit 22E outputs a low-level signal.

Further, in a state in which both the trimming fuses F5 and F6 are disconnected, a charge-control terminal Cout turns low when the voltage of the secondary battery Bat is not greater than the sum of the threshold voltages of the PMOS transistor M3, M9, and M10. Thereby, the charge-control NMOS transistor M12 shown in FIG. 1 is turned off, inhibiting charging of the secondary battery Bat.

In other words, similarly to the charge prevention circuit 40 shown in FIG. 5, the low voltage criterial voltage can be raised by a voltage identical to the threshold voltages of the PMOS transistors M9 and M10.

In the charge-prevention circuit 40E shown in FIG. 10, by increasing the number of sets of the diode-connected PMOS transistor and the trimming fuse connected in parallel, a range of the low-voltage criterial voltage can be extended. Moreover, by changing the threshold voltages of the diode-connected PMOS transistors, the number of set values of the low-voltage criterial voltage can be increased.

Figure 11:
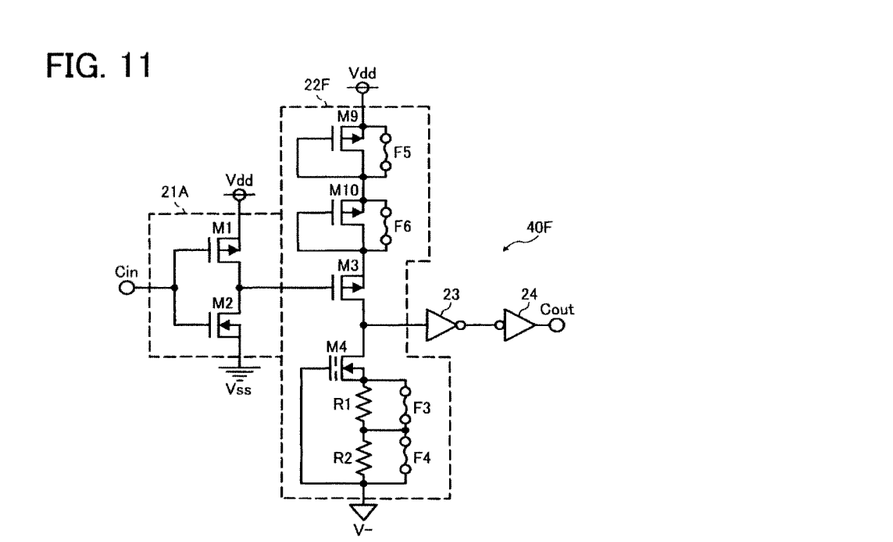
FIG. 11 illustrates an example of circuitry of a charge prevention circuit according to another illustrative embodiment.

FIG. 11 illustrates an example of circuitry of a charge prevention circuit 40F according to another embodiment.

The charge prevention circuit 40F shown in FIG. 11 includes a second inverter circuit 22F that is formed by combining trimming portions of the second inverter circuits 22A and 22E shown in FIGS. 6 and 10.

More specifically, the second inverter circuit 22F includes diode-connected PMOS transistors M9 and M10 connected serially between a source of a PMOS transistor M3 (second PMOS transistor) and the positive power source terminal Vdd, a trimming fuse F5 connected between a source and a drain of the PMOS transistor M9, a trimming fuse F6 connected between a source and a drain of the PMOS transistor M10, resistors R1 and R2 connected serially between a source of a depression-type NOS transistor M4 and a negative power source terminal V− connected to the negative power source terminal of the charger 30, and trimming fuses F3 and F4 respectively connected in parallel to the resistors R1 and R2.

As described above with reference to FIGS. 6 and 10, disconnecting the trimming fuses F3 and F4 can lower the low-voltage criterial voltage by a unit voltage smaller than the threshold voltage. Further, disconnecting the trimming fuses F5 and F6 can raise the low-voltage criterial voltage by a voltage identical to the threshold voltage of the PMOS transistor. That is, in the second inverter circuit 22F shown in FIG. 11, the low-voltage criterial voltage can be set in a broader range and at shorter intervals.

It is to be noted that, although the description above concerns the configuration in which the second inverter circuit 22E shown in FIG. 10 is combined with the second inverter circuit 22A shown in FIG. 6, the trimming portion to be combined with the secondary inverter circuit 22E is not limited thereto, but can be any one of the second inverter circuits 22A through 22D shown in FIGS. 6 through 9.

Figure 12:
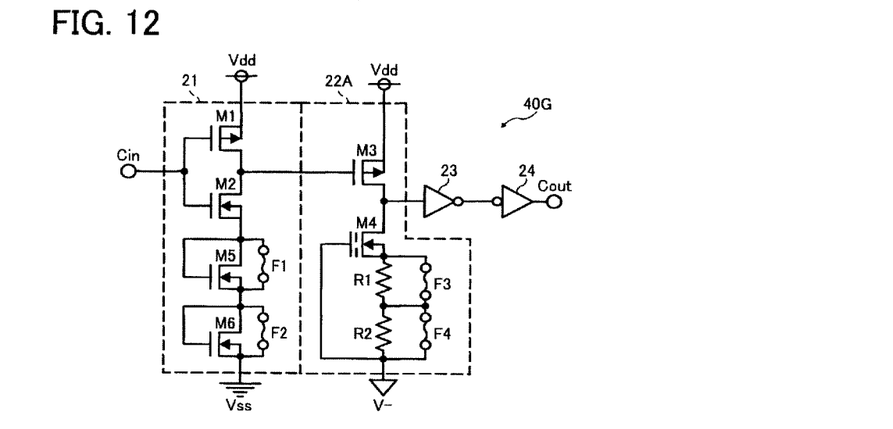
FIG. 12 illustrates an example of circuitry of a charge prevention circuit according to another illustrative embodiment.

FIG. 12 illustrates an example of circuitry of a charge prevention circuit 40G according to another embodiment.

Referring to FIG. 12, the charge prevention circuit 40G is formed by combining the first inverter circuit 21 shown in FIG. 5 and the second inverter circuit 22A shown in FIG. 6.

More specifically, the first inverter circuit 21 includes a PMOS transistor M1, an NMOS transistor M2, diode-connected NMOS transistors M5 and M6 connected, serially between a source of the NMOS transistor M2 and the negative power source terminal Vss, a trimming fuse F1 connected between a source and a drain of the NMOS transistor M5, and a trimming fuse F2 connected between a source and a drain of the NMOS transistor M6. The second inverter circuit 22A includes a PMOS transistor M3, a depression-type NMOS transistor M4, resistors R1 and R2 connected serially between a source of the depression-type NMOS transistor M4 and the negative power source terminal V− connected to the negative power source terminal of the charger 30, and trimming fuses F3 and F4 connected in parallel to the resistors R1 and R2, respectively.

As described above with reference to FIGS. 5 and 6, disconnecting the trimming fuses F1 and F2 can raise the low-voltage criterial voltage by a unit voltage equal to the threshold voltage of the NMOS transistor. Further, disconnecting the trimming fuses F3 and F4 can lower the low-voltage criterial voltage. Thus, the low-voltage criterial voltage can be set more flexibly in a broader range and at shorter intervals.

It is to be noted that, although the description above concerns the configuration in which the first inverter circuit 21 shown in FIG. 5 and the second inverter circuits 22A shown in FIG. 6, the first inverter circuit 21 and any one of the second inverter circuits 22A though 22D shown in FIGS. 6 through 9 can be combined.

As described above, the charge prevention circuits according to various embodiment described above, incorporated into the battery protection semiconductor device that can protect a secondary battery includes the first inverter circuit connected to the power source terminal of the second battery, and the second inverter circuit connected to the power source terminal of the charger. At least one of the input threshold voltages of the first inverter circuit and the second inverter circuit can be changed using the trimming fuse, and accordingly the predetermined or given low-voltage criterial voltage of the charge prevention circuit can be changed.

Thereby, a single battery protection semiconductor device can accommodate multiple low-voltage criterial voltages, attaining a versatile battery protection semiconductor device as well as improving accuracy of detecting the low-voltage state.

Because the low-voltage criterial voltage can be raised and lowered using the trimming fuse, purposes of battery protection semiconductor device can be increased.

The low-voltage criterial voltage can be changed by steps of the threshold voltages of the MOS transistor. Alternatively, the low-voltage criterial voltage can be changed step-by-step in a range smaller than the input threshold voltage of the MOS transistor. By combining these two methods of changing the low-voltage criterial voltage, the voltage criterial voltage can be set at shorter intervals, improving the accuracy of detecting the low-voltage state.

Additionally, by incorporating the battery protectors described above in a battery pack, the low-voltage criterial voltage thereof can be set at shorter intervals, and can be switched among multiple set values to either to a higher set value or a lower set value. Further, the battery pack can accommodate multiple set values of the low-voltage criterial voltage using a single semiconductor device.

The battery back can be used for various electronic devices, such as mobile phones, portable computers, and PDAs (Personal Digital Assistances).

Numerous additional modifications and variations are possible in light of the above teachings. It is therefore to be understood that, within the scope of the appended claims, the disclosure of this patent specification may be practiced otherwise than as specifically described herein.

This patent specification is based on and claims priority from Japanese Patent Application No. 2008-022316, filed on Feb. 1, 2008 in the Japan Patent Office, the entire contents of which are hereby incorporated by reference herein.

What is claimed is:

1. A battery pack comprising:
   a secondary battery:,
   a discharge-control transistor;
   a charge-control transistor connected in series with the discharge-control transistor between a negative lower source terminal of the secondary battery and either a terminal of a load or a negative power source terminal of a charger; and
   a battery protection semiconductor device for protecting the secondary battery,
   the battery protection semiconductor device comprising:
   a detection circuit to detect at least one of an excessively charged state, an excessive discharging state, an over-current state, a short-circuit state, and an overheating state of the secondary battery;
   a control circuit to turn on and off the discharge-control transistor and the charge-control transistor; and
   a charge prevention circuit to prevent the secondary battery from being charged by turning off the charge-control transistor when a voltage of the secondary battery is not greater than a predetermined low-voltage criteria voltage that is variable by trimming a portion of the charge prevention circuit,
   wherein the charge prevention circuit comprises:
   a first inverter circuit that receives a high-level signal during a charging mode, connected to both the negative power source terminal and a positive power source terminal of the secondary battery; and
   a second inverter circuit that receives an output from the first inverter circuit, connected to both the negative power source terminal and a positive power source terminal of the charger, and
   wherein an input threshold voltage of the second inverter circuit is variable by trimming a portion of the second inverter circuit, and the charge-control transistor is turned off according to an output from the second inverter circuit when the voltage of the secondary battery is not greater than the low-voltage criterial voltage.

2. The battery pack according to claim 1, wherein the input threshold voltage of the second inverter circuit is raised by trimming a portion thereof.

3. The battery pack according to claim 2, wherein the second inverter circuit comprises:
   a second PMOS transistor whose gate and source are connected to an output terminal of the first inverter circuit and the positive power source terminal of the charger, respectively;
   a depression-type NMOS transistor whose gate is connected to the negative power source terminal of the charger;
   at least one resistor connected serially between a source of the depression-type NMOS transistor and the negative power source terminal of the charger; and a trimming fuse connected in parallel to each of the at least one resistor, wherein a function node between drains of the second PMOS transistor and the depression-type NMOS transistor serves as an output terminal of the second inverter circuit.

4. The battery pack according to claim 2, wherein the second inverter circuit comprises:
a second PMOS transistor whose gate and source are connected to an output terminal of the first inverter circuit and the positive power source terminal of the charger, respectively;
a first depression-type NMOS transistor whose gate, source, and back gate are connected to the negative power source terminal of the charger;
at least one second depression-type NMOS transistor whose gate and back gate are respectively connected to a source thereof and the negative voltage terminal of the charger, connected serially between a drain of the second PMOS transistor and a drain of the first depression-type NMOS transistor; and
a trimming fuse connected between a source and a drain of each of the at least one second depression-type NMOS transistor.

5. The battery pack according to claim 2, wherein the second inverter circuit comprises:
a second PMOS transistor whose gate and source are connected to an output terminal of the first inverter circuit and the positive power source terminal of the charger, respectively;
a first depression-type NMOS transistor whose gate, source, and back gate are connected to the negative power source terminal of the charger;
at least one second depression-type NMOS transistor whose gate and back gate are respectively connected to the negative voltage terminal of the charger and a source thereof, connected serially between a drain of the second PMOS transistor and a drain of the first depression-type NMOS transistor; and
a trimming fuse connected between a source and a drain of each of the at least one second depression-type NMOS transistor.

6. The battery pack according to claim 2, wherein the second inverter circuit comprises:
a second PMOS transistor whose gate and source are connected to an output terminal of the first inverter circuit and the positive power source terminal of the charger, respectively;
a first depression-type NMOS transistor whose gate, source, and back gate are connected to the negative power source terminal of the charger;
at least one second depression-type NMOS transistor whose gate and back gate are connected to the negative voltage terminal of the charger, connected serially between a drain of the second PMOS transistor and a drain of the first depression-type NMOS transistor; and
a trimming fuse connected between a source nd a drain of each of he at least one second depression-type NMOS transistor.

7. The battery pack according to claim 1, wherein the input threshold voltage of the second inverter circuit is lowered by trimming.

8. The battery pack according to claim 7, wherein the second inverter circuit comprises:
a second PMOS transistor whose gate is connected to an output terminal of e first inverter circuit;

a depression-type NMOS transistor whose gate and source are connected to the negative power source terminal of the charger;
at least one diode-connected PMOS transistor connected serially between a source of the second PMOS transistor nd the positive power source terminal of the charger; and
a trimming fuse connected between a source and a drain of each of the at least one diode-connected PMOS transistor,
wherein a junction node between drains of the second PMOS transistor and the depression-type NMOS transistor serves as an output terminal of the second inverter circuit.

9. The battery pack according to claim 1, wherein the second inverter circuit comprises:
a second PMOS transistor whose gate is connected to an output terminal of the first inverter circuit;
at least one diode-connected PMOS transistor connected serially between a source of the second PMOS transistor and the positive power source terminal of the charger;
a trimming fuse connected between a source and a drain of each of the at least one diode-connected PMOS transistor;
a depression-type NMOS transistor whose gate is connected to the negative power source terminal of the charger;
at least resistor connected serially between a source of the depression-type NMOS transistor and the negative power source terminal of the charger; and
a trimming fuse connected in parallel to each of the t least one resistor,
wherein a junction node between drains of the second PMOS transistor and the depression-type NMOS transistor serves as an output terminal of the second inverter circuit.

10. The battery pack according to claim 1, wherein the second inverter circuit comprises:
a second PMOS transistor whose gate is connected to an output terminal of the first inverter circuit;
at least one diode-connected PMOS transistor connected serially between a source of the second PMOS transistor and the positive power source terminal of the charger;
a trimming fuse connected between a source and a drain of each of the at least one diode-connected PMOS transistor;
a first depression-type NMOS transistor whose gate is connected to the negative power source terminal of the charger;
at least one second depression-type NMOS transistor whose gate and back gate are respectively connected to a source thereof and the negative voltage terminal of the charger, connected serially between a drain of the second PMOS transistor and a drain of the first depression-type NMOS transistor; and
a trimming fuse connected between a source and a drain of each of the at a one second depression-type NMOS transistor.

11. The battery pack according to claim 1, wherein the second inverter circuit comprises:
a second PMOS transistor whose gate is connected to an output terminal of the first inverter circuit;
at least one diode-connected PMOS transistor connected serially between a source of the second PMOS transistor and the positive power source terminal of the charger;
a trimming fuse connected between a source and a drain of each of the at least one diode-connected PMOS transistor;

a first depression-type NMOS transistor whose gate, source, and back gate are connected to the negative power source terminal of the charger;

at least one second depression-type NMOS transistor whose gate and back gate are respectively connected to the negative voltage terminal of the charger and a source thereof, connected serially between a drain of the second PMOS transistor and a drain of the first depression-type NMOS transistor; and a trimming fuse connected between a source and a drain al each of the at least one second depression-type NMOS transistor.

12. The battery pack according to claim 1, wherein the second inverter circuit comprises:

a second PMOS transistor whose gate is connected to an output terminal of the first inverter circuit;

at least one diode-connected PMOS transistor connected serially between a source of the second PMOS transistor and the positive power source terminal of the charger;

a trimming fuse connected between a source and a drain of each of the at least one diode-connected PMOS transistor;

a first depression-type NMOS transistor whose gate, source, and back gate are connected to the negative power source terminal of the charger;

at least one second depression-type NMOS transistor whose gate and back gate are connected to the negative voltage terminal of the charger, connected serially between a drain of the second PMOS transistor and a drain of the first depression-type NMOS transistor; and a trimming fuse connected between a source and a drain of each of the at least one second depression-type NMOS transistor.

13. The battery pack according to claim 1, wherein an input threshold voltage of the first inverter circuit is variable by trimming a portion thereof as well as that of the second inverter circuit.

14. The battery pack according to claim 13, wherein the input threshold voltage of the second, inverter circuit is raised by trimming a portion thereof.

15. The battery pack according to claim 13, wherein the second inverter circuit comprises:

a second PMOS transistor whose gate and source are connected to an output terminal of the first inverter circuit and the positive power source terminal of the charger, respectively;

a depression-type NMOS transistor whose gale is connected to the negative power source terminal of the charger;

at least one resistor connected serially between a source of the depression-type NMOS transistor and the negative power source terminal of the charger; and a trimming fuse connected in parallel to each of the at least one resistor, wherein a junction node between drains of the second PMOS transistor and the depression-type NMOS transistor serves as an output terminal of the second inverter circuit.

* * * * *